US008639428B2

(12) United States Patent
Holzwarth

(10) Patent No.: US 8,639,428 B2
(45) Date of Patent: Jan. 28, 2014

(54) ELECTROMECHANICAL BRAKE SYSTEM WITH A FAILSAFE ENERGY SUPPLY AND METHOD FOR FAILSAFE ENERGY SUPPLY IN AN ELECTROMECHANICAL BRAKE SYSTEM FOR VEHICLES

(75) Inventor: Jörgen Holzwarth, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 922 days.

(21) Appl. No.: 12/598,964

(22) PCT Filed: Apr. 29, 2008

(86) PCT No.: PCT/EP2008/055276
§ 371 (c)(1),
(2), (4) Date: May 21, 2010

(87) PCT Pub. No.: WO2008/135470
PCT Pub. Date: Nov. 13, 2008

(65) Prior Publication Data
US 2010/0243388 A1 Sep. 30, 2010

(30) Foreign Application Priority Data

May 7, 2007 (DE) .......................... 10 2007 021 286

(51) Int. Cl.
*B60T 7/12* (2006.01)
(52) U.S. Cl.
USPC ............ 701/76; 701/71; 701/70; 303/122.03; 303/22.4; 303/3; 303/15; 303/20; 188/158; 188/72.1; 318/632
(58) Field of Classification Search
None
See application file for complete search history.

(56) References Cited

U.S. PATENT DOCUMENTS 6,244,675 B1 * 6/2001 Behrends et al. ............. 303/155
6,299,261 B1 * 10/2001 Weiberle et al. ................ 303/20
(Continued)

FOREIGN PATENT DOCUMENTS

DE 19829126 A1 * 5/1999
DE 19826131 12/1999 .............. B60T 13/74
(Continued)

OTHER PUBLICATIONS

Isermann, R., Schwarz, R., Stolzl, S. Fault-tolerant Drive-by-Wire Systems IEEE Control Systems Magazine, 0272-1708/02 (Oct. 2002), pp. 13-18.*

(Continued)

*Primary Examiner* — Thomas Black
*Assistant Examiner* — Paul Castro
(74) *Attorney, Agent, or Firm* — King & Spalding L.L.P.

(57) ABSTRACT

An electromechanical brake system and an associated method with a failsafe energy supply, have a first to fourth brake module with at least one control unit and brake actuation unit. In order to supply the modules with electrical energy, the control unit and the brake actuation unit are each connected to at least one main energy supply unit via independently fed lines. In order to supply additional electrical energy to the modules, a first emergency energy supply unit is connected to the control unit and brake actuation unit of the first and fourth brake module and a second emergency energy supply unit is connected to those of the second and third brake module, respectively via additional independently fed lines, wherein the selection of the energy supply unit is made via switches actuated at least partially separately from one another via at least one central control system.

13 Claims, 5 Drawing Sheets

(56) References Cited

U.S. PATENT DOCUMENTS

| | | | |
|---|---|---|---|
| 6,317,675 B1 | 11/2001 | Stölzl et al. | 701/76 |
| 6,345,225 B1* | 2/2002 | Bohm et al. | 701/70 |
| 6,402,259 B2* | 6/2002 | Corio et al. | 303/20 |
| 6,749,269 B1 | 6/2004 | Niwa | 303/20 |
| 7,837,278 B2* | 11/2010 | Nilsson | 303/20 |
| 2005/0222726 A1* | 10/2005 | Furui et al. | 701/36 |
| 2006/0061210 A1* | 3/2006 | Ralea | 303/20 |
| 2007/0024111 A1* | 2/2007 | Ganzel | 303/116.2 |
| 2009/0200124 A1* | 8/2009 | Heise | 188/162 |

FOREIGN PATENT DOCUMENTS

| | | | |
|---|---|---|---|
| EP | 1026060 A2 | 8/2000 | B60T 13/74 |
| EP | 1283139 | 2/2003 | B60T 8/88 |
| WO | 99/26820 A1 | 6/1999 | B60T 8/00 |
| WO | 9926821 | 6/1999 | B60T 8/00 |

OTHER PUBLICATIONS

Strunk Jr.. W, White. E.B. The Elements of Style. 3rd ed. New York, Macmillan Publishing Co.., Inc., 1979. pp. 40 PE1408.S772.*
International Search Report and Written Opinion for Application No. PCT/EP2008/055276 (12 pages), Aug. 26, 2008.

* cited by examiner

ELECTROMECHANICAL BRAKE SYSTEM WITH A FAILSAFE ENERGY SUPPLY AND METHOD FOR FAILSAFE ENERGY SUPPLY IN AN ELECTROMECHANICAL BRAKE SYSTEM FOR VEHICLES

CROSS-REFERENCE TO RELATED APPLICATIONS

This application is a U.S. National Stage Application of International Application No. PCT/EP2008/055276 filed Apr. 29, 2008, which designates the United States of America, and claims priority to German Application No. 10 2007 021 286.2 filed May 7, 2007, the contents of which are hereby incorporated by reference in their entirety.

TECHNICAL FIELD

The invention relates to an electromechanical brake system with a failsafe energy supply and a method for failsafe energy supply in an electromechanical brake system for vehicles.

BACKGROUND

Electromechanical brake systems, in particular for vehicles, are known, wherein the hydraulic brake actuator units provided to transmit the braking force to the brake disk connected to a wheel are replaced by high-performance electromechanical brake actuator units, which can be controlled and regulated electrically by a central control system disposed in the vehicle. Such electromechanical brake systems are also referred to as brake by wire systems. Such a brake actuator unit can be configured as a fully electronic, electro-hydraulic or electro-pneumatic unit.

The brake actuator unit is generally disposed together with at least one control device in a brake module, which is associated with a wheel of the vehicle. The brake actuator unit is activated by way of the control device associated with the brake actuator unit. The control device receives the control commands required to activate the brake actuator unit from the at least one control system disposed centrally in the vehicle, which generally activates four brake modules associated with the respective wheels in a common manner.

By actuating an actuation element provided in the vehicle, for example a brake pedal, at least one electronic brake signal is generated, which is transmitted to the central control system and activation of the respective control device and thus the associated brake actuator unit is effected as a function thereof.

One important criterion for the described electromechanical brake system is the identification, elimination and control of system faults occurring in the central control system and/or in the brake modules and/or in the energy supply to the cited components, which can threaten the availability of the electromechanical brake system and thus the safety of the occupants of the vehicle.

Such electromechanical brake systems frequently have auxiliary brake functions, by way of which actuation on controlled stages (secondary braking) of individual undamaged brake actuator units is still possible even after the occurrence of a fault. In known brake systems in addition to actuation of the service brake it is also possible to brake the vehicle using the parking brake, in other words if one of the components affecting the service brake fails, it is still possible to carry out secondary braking by way of the actuation element of the parking brake.

Numerous designs for achieving "one fault tolerant" electromechanical brake systems are already known from the prior art. For example WO 99/26820 describes an electromechanical brake system, the central control unit of which has three computer units, the output signals of which are checked in respect of plausibility by means of a voter unit. If the control signal of one of the computer units deviates from the control signals generated by the further computer units, it is identified as faulty by means of the voter unit and the defective computer unit is excluded from further signal processing. This should prevent activation of the brake modules by means of defective control signals. If a second fault now occurs in the form of the failure of the voter unit, further reliable actuation of the brake system is no longer possible, in other words a further second fault can result in the failure of the entire electromechanical brake system.

With hydraulic brake systems in particular it is already known that the brake circuits within the vehicle can be divided up to increase fault tolerance. Similarly the brake circuit of the electromechanical brake system can be broken down into at least two brake circuits, in other words brake modules associated with at least two different wheels respectively are combined to form one functional unit and are activated in a common manner. For example the brake modules associated with diagonally opposing wheels can respectively form one functional unit. If one of said functional units fails, it is possible to continue braking by way of the brake actuator units of the functioning functional unit, in other words secondary braking is ensured by actuating one of the two brake circuits of the service brake.

To supply the individual control devices and brake actuator units of the brake modules of the electromechanical brake system with electrical energy, in particularly the necessary operating voltage or current strength, these are connected respectively for example by way of separate energy supply lines to a main energy supply unit. In addition to the main energy supply unit provision is made in known systems for at least one emergency energy supply unit, which absorbs a failure of the main energy supply unit and in the event of a fault the energy supply to at least the safety-related elements of the electromechanical brake system is taken over by the emergency energy supply unit.

By disconnecting the energy supply it is also possible to disconnect a defective brake module within the electromechanical brake system and the energy supply to the brake actuator unit or the associated control device is also interrupted. The brake module which has been switched to be without current or voltage then opens automatically. In particular if a second fault occurs, incorrect actuation of a brake module may take place, with the result that an undesirable braking force is generated. In this instance controlled opening of the service brake is no longer possible by way of the associated control device, in other words the service brake brakes unexpectedly or locks, thereby endangering the drive stability of the vehicle. Specific disconnection of the energy supply allows such faults to be eliminated even if a first and second system fault for example occur within the control device associated with the individual wheel. The remaining functioning brake modules are advantageously available for secondary braking and therefore controlled slowing of the vehicle.

With conventional electromechanical brake systems two independent energy supply lines respectively are provided for each brake module to supply the brake actuator unit and the control device. Two independent switching paths are therefore available to disconnect the energy supply to one brake module in each instance. For the entire electromechanical brake system therefore eight power supply lines have to be monitored by means of for example eight voter units to achieve a "two fault tolerance", in other words one voter unit has to be provided for each supply line. This involves a high control and/or component outlay.

SUMMARY

According to various embodiments, an electromechanical brake system with a failsafe energy supply and an associated method for failsafe energy distribution in an electromechanical brake system can be specified, which continues to ensure an energy supply to at least two functioning brake modules after the occurrence of both a first and a second system fault. The disconnection of brake modules braking in an undesirable manner due to the occurring system faults is also ensured by isolating their energy supply.

According to an embodiment, an electromechanical brake system for vehicles with a failsafe energy distribution may comprise a first to fourth brake module associated respectively with a wheel of the vehicle, each comprising at least one control device and a brake actuator unit, with the control device and the brake actuator unit of a brake module being connected respectively by way of separately fed energy supply lines to at least one main energy supply unit to supply the brake modules with electrical energy, wherein, to supply the brake modules additionally with electrical energy, a first emergency energy supply unit is connected to the control device and to the brake actuator unit of the first and fourth brake module and a second emergency energy supply is connected to the control device and to the brake actuator unit of the second and third brake module by way of respectively additional separately fed energy supply lines, the selection of the energy supply units provided to supply energy to the brake module being made by way of switching means, which can be activated at least partially separately from one another by way of at least one central control system.

According to a further embodiment, to control the distribution of the electrical energy to the respective control device and the respective brake actuator unit, at least a first and second voter unit can be provided. According to a further embodiment, first to eighth switching means can be provided to switch through the energy supply lines and additional first to eighth switching means are provided to switch through the additional energy supply lines, it being possible to switch these separately from one another. According to a further embodiment, the first voter unit may be provided to control the first to eighth switching means and the second voter unit is provided to control the additional first to eighth switching means. According to a further embodiment, a switching means can be formed by a controllable switching element or a series circuit of two controllable switching elements or a series circuit of one controllable switching element and a diode element. According to a further embodiment, in the state without current or voltage the switching means may have a predetermined switching state, which is selected variously as a function of the respectively present switching structure, in particular the number of voter units provided. According to a further embodiment, the first brake module can be associated with the right front wheel, the second brake module with the left front wheel, the third brake module with the right rear wheel and the fourth brake module with the left rear wheel. According to a further embodiment, the association of the energy supply units with the brake modules can be selected such that the brake circuits are allocated diagonally, by side, by axis or by wheel. According to a further embodiment, the energy supply to the first or second voter unit can be disconnected by way of further switching means, it being possible for the switching means to be controlled by way of at least one control unit provided in the central control system. According to a further embodiment, the at least one control unit can be set up to evaluate the voltages and/or currents present at the brake actuator units, with the energy supply to the first or second voter unit being disconnected by way of the further switching means as a function of the result of the evaluation.

According to another embodiment, a method for failsafe energy distribution in an electromechanical brake system for vehicles comprising a first to fourth brake module associated respectively with a wheel of the vehicle, each comprising at least one control device and a brake actuator unit, wherein the control device and the brake actuator unit of a brake module are supplied with electrical energy separately from one another under the control of at least one central control system, may comprise the steps of: detecting the occurrence of a first and second system fault by way of the at least one central control system and controlling the energy distribution in the electromechanical brake system by way of the at least one central control system such that after the occurrence of a first and second system fault at least two brake modules are still available to brake the vehicle and at least one of the remaining brake modules affected by the first and/or second system fault is disconnected.

According to a further embodiment, the electrical energy can be supplied from at least one main energy supply unit to the brake modules respectively by way of separately fed energy supply lines and additional electrical energy is supplied to the control device and to the brake actuator unit of the first and fourth brake module by way of a first emergency energy supply unit and to the control device and to the brake actuator unit of the second and third brake module by way of a second emergency energy supply unit, being supplied by way of respectively additional, separately fed energy supply lines. According to a further embodiment, the energy supply lines can be switched through separately from one another by way of first to eighth switching means and the additional energy supply lines are switched through separately from one another by way of additional first to eighth switching means. According to a further embodiment, the electrical energy can be distributed to the wheels of the vehicle by side, by axle or by wheel. According to a further embodiment, in the state without current or voltage the switching means can be controlled to a predetermined switching state, which is selected variously as a function of the respectively present switching structure.

BRIEF DESCRIPTION OF THE DRAWINGS

The invention is described in more detail below based on an exemplary embodiment with reference to figures, in which.

DETAILED DESCRIPTION

Figure 1:
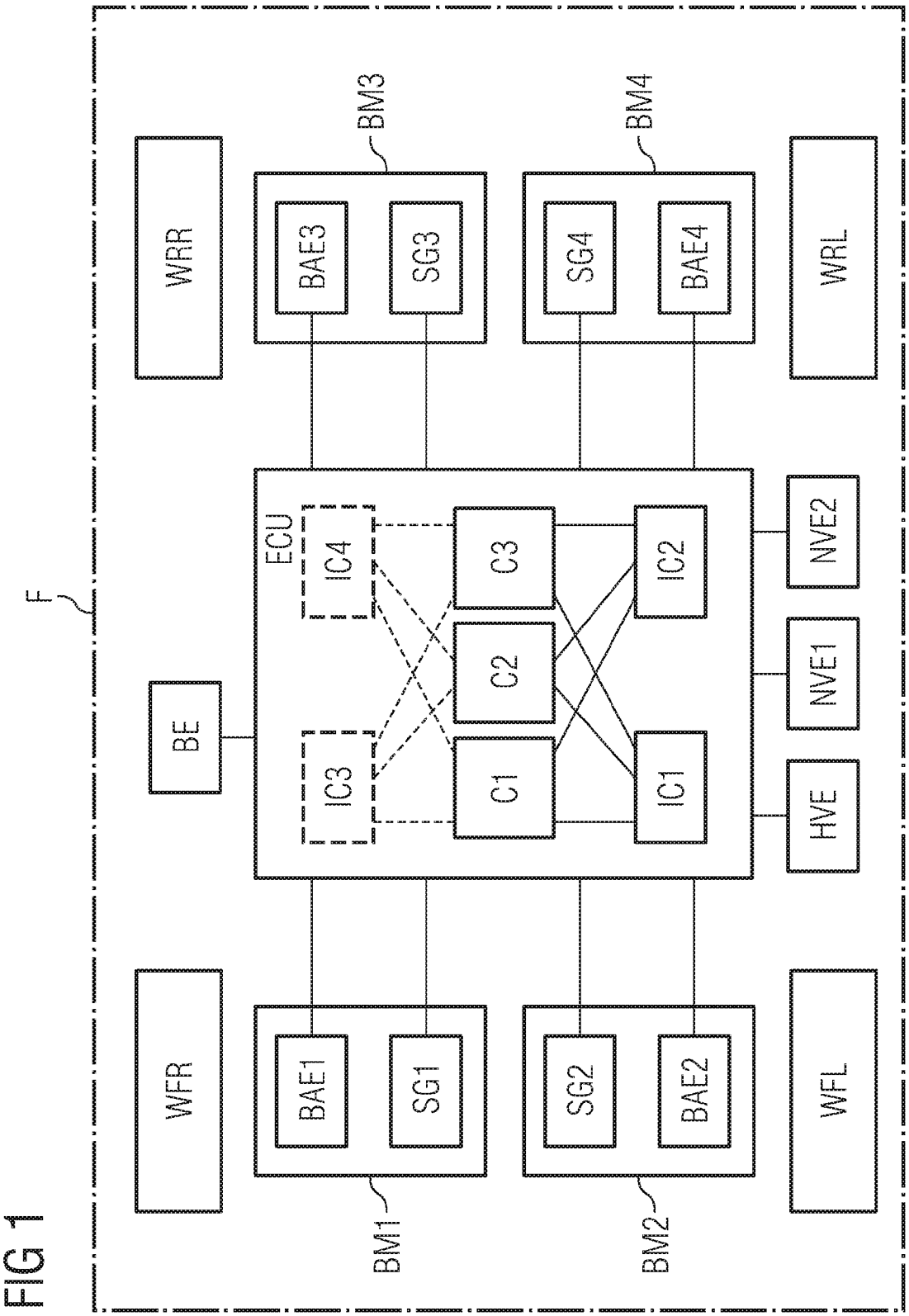
FIG. 1 shows a schematic block circuit diagram of an example of an electromechanical brake system integrated in a vehicle.

According to various embodiments, to supply the brake modules additionally with electrical energy a first emergency energy supply unit is connected to the control device and to the brake actuator unit of the first and fourth brake modules and a second emergency energy supply is connected to the control device and to the brake actuator unit of the second and third brake modules by way of respectively additional, separately fed, energy supply lines, the selection of the energy supply units provided to supply energy to the brake modules being made by way of switching means, which can be activated at least partially separately from one another by way of at least one central control system. The advantageous association of two brake modules respectively with an emergency energy supply unit on the one hand and the provision of centrally controllable switching means on the other hand mean that the switching structure according to various embodiments allows safe opening of a brake module that is braking in an undesirable manner by disconnecting its electrical energy supply even after the occurrence of a second fault (2 fault tolerance). To this end it is sufficient to supply no further electrical energy at least to the brake actuator unit or the control device of the defective brake module, in other words to switch the brake module to be without current or voltage, with the result that the brake actuator unit is automatically opened. Also with the switching structure according to various embodiments, at least two brake actuator modules are still advantageously available for example for secondary braking even after the occurrence of two faults in the energy supply to the electromechanical brake system.

Also at least a first and second voter unit is advantageously provided to control the distribution of the electrical energy to the respective control device and the respective brake actuator unit, being provided to control the first to eighth switching means provided to switch the energy supply lines through and the additional energy supply lines by way of additional first to eighth switching means, which can be switched separately from one another in each instance. The first voter unit here is provided to control the first to eighth switching means and the second voter unit is provided to control the additional first to eighth switching means. A switching means can be formed for example by a controllable switching element or a series circuit of two controllable switching elements or a series circuit of one controllable switching element and a diode element.

In the state without current or voltage the switching means particularly advantageously have a predetermined switching state, which can be selected variously as a function of the respectively present switching structure, in particular the number of voter units provided. This switching state advantageously takes on a state that is safe for driving the vehicle if the controlling unit fails. This switching state can either connect a brake module to a specifically selected energy source or isolate said brake module from a specifically selected energy source without activation, i.e. by default so to speak, as a function of the switching structure.

According to an embodiment, the association of the energy supply units with the brake modules is selected such that the brake circuits are allocated diagonally, by side, by axis or by wheel.

In particular when two voter units are used, the energy supply to the first or second voter unit can be disconnected by way of further switching means, it being possible to control the switching means by way of at least one control unit provided in the central control system. To this end the at least one control unit is set up to evaluate the voltages and/or current present at the brake actuator units, with the energy supply to the first or second voter unit being disconnected by way of the further switching means as a function of the result of the evaluation.

According to the method for failsafe energy distribution in an electromechanical brake system for vehicles the occurrence of a first and second system fault is also detected particularly advantageously by way of the at least one central control system and the energy distribution in the electromechanical brake system is controlled by way of the at least one central control system such that after the occurrence of a first and second system fault at least two brake modules are still available to brake the vehicle and at least one of the remaining brake modules affected by the first and/or second system fault is disconnected.

FIG. 1 shows a schematic block circuit diagram of an example of an electromechanical brake system integrated in a vehicle F, which is provided to brake at least one right and left front wheel WFR, WFL and one right and left rear wheel WRR, WRL.

In the present exemplary embodiment the electromechanical brake system has at least one central control system ECU and a first to fourth brake module BM1 to BM4. By way of example the first brake module BM1 is associated with the right front wheel WFR, the second brake module BM2 with the left front wheel WFL, the third brake module BM3 with the right rear wheel WRR and the fourth brake module BM4 with the left rear wheel WRL.

The electromechanical brake system for example forms the service brake system of the vehicle F, for the actuation of which at least one actuation element BE is provided in the vehicle F. The actuation element BE can be formed by a brake pedal for example, which to this end is connected to the central control system ECU of the electromechanical brake system. At least one further electromechanical brake system, for example an electronic parking brake system (not shown in the figures) can also be provided in the vehicle F, for the actuation of which further actuation elements and in some instances also an additional control arrangement can be provided in the vehicle.

In the exemplary embodiment being considered the at least one central control system ECU has at least one first, second and third control unit C1, C2, C3 and at least two voter units IC1, IC2 (2 voter design), these being a first and second voter unit IC1, IC2, with one of the voter units IC1, IC2 respectively being connected to one of the control units C1, C2, C3, in other words the first and second voter units IC1, IC2 are connected individually to the first to third control units C1, C2, C3 respectively, among other things to monitor the fault-free operation of these. The control units C1-C3 are configured as microcontrollers in one preferred embodiment.

In the present embodiment the activation of the first to fourth brake modules BM1-BM4 of the electromechanical brake system is designed with threefold redundancy, in other words if one of the first to third control units C1-C3 operates defectively, the defective control unit is identified by at least one of the two voter units IC1, IC2 and excluded from signal processing for controlling the electromechanical brake system. To this end the at least two voter units IC1, IC2 perform one or more appropriate test functions, for example comparing the output signals of the first to third control unit C1-C3.

In the present exemplary embodiment at least one first and second voter unit IC1, IC2 are provided to increase the fault tolerance of the electromechanical brake system, so that if one of the voter units IC1, IC2 fails a functioning voter unit remains to monitor the first to third control unit C1-C3. To further increase fault tolerance, in an alternative embodiment according to FIG. 3 for example a first to third voter unit IC1, IC2, IC3 can be provided or according to FIG. 4 a first to fourth voter unit IC1, IC2, IC3, IC4 can be provided. This again improves the susceptibility to error and the reliability of the electromechanical brake system considerably. The voter units IC1, IC2, IC3, IC4 can be configured here as hardware voter units or as software voter units. With configuration as software voter units in particular, they can be integrated in control units already provided in the electromechanical brake system, for example the first to third control units C1-C3.

The first to fourth brake modules BM1 to BM4 respectively have a brake actuator unit BAE1 to BAE4 and a control device SG1 to SG4. In particular a first brake actuator unit BAE1 and a first control device SG1 are provided in the first brake module BM1, a second brake actuator unit BAE2 and a second control device SG2 are provided in the second brake module BM2, a third brake actuator unit BAE3 and a third control device SG3 are provided in the third brake module BM3 and a fourth brake actuator unit BAE4 and a fourth control device SG4 are provided in the fourth brake module BM4, with the first to fourth control device SG1 to SG4 being connected respectively to the associated first to fourth brake actuator unit BAE1 to BAE4.

The electromechanical brake system is connected to at least one main energy supply unit HEV, for example the vehicle battery, and at least one first and second emergency energy supply unit NEV1, NEV2 to supply the first to fourth brake module BM1 to BM4 or the first to fourth brake actuator unit BAE1 to BAE4 and the first to fourth control device SG1 to SG4 with electrical energy. The first and second emergency energy supply units NEV1, NEV2 can be formed for example by additional battery units provided in the vehicle F.

The above-mentioned energy supply units HEV, NEV1, NEV2 are connected for example to the central control system ECU, which regulates the distribution of electrical energy supplied by the main energy supply unit HEV and the at least first and second emergency energy supply units NEV1, NEV2 within the electromechanical brake system.

Figure 2:
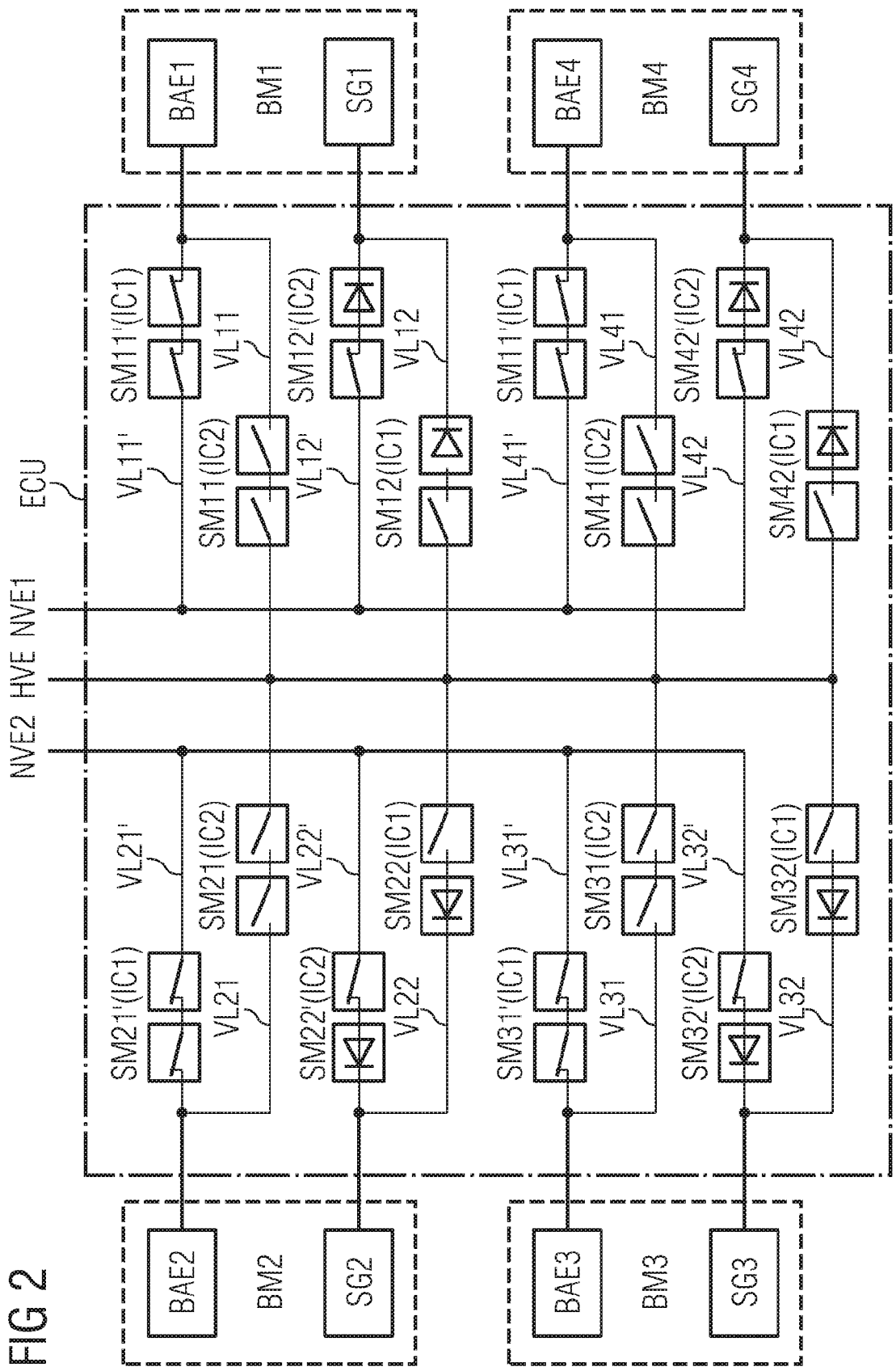
FIG. 2 shows an example of a circuit structure with two voter units provided to supply energy to the electromechanical brake system.

To this end for example according to FIG. 2 the first to fourth control device SG1-SG4 and the first to fourth brake actuator unit BAE1-BAE4 are connected respectively to the main energy supply unit HVE by way of separately fed first to eighth energy supply lines VL11, VL12, VL21, VL22, VL31, VL32, VL41, VL42, preferably by way of the central control system ECU. The first to eighth energy supply lines VL11, VL12, VL21, VL22, VL31, VL32, VL41, VL42 have first to eighth switching means SM11, SM12, SM21, SM22, SM31, SM32, SM41, SM42, which can be switched by way of the central control system ECU, in particular the first and second voter unit IC1, IC2 disposed there.

To supply the first to fourth brake module BM1-BM4 or its first to fourth control device SG1-SG4 and its first to fourth brake actuator unit BAE1-BAE4 additionally with electrical energy, the first emergency energy supply unit NVE1 for example is connected to the first and fourth control device SG1, SG4 and to the first and fourth brake actuator unit BAE1, BAE4 of the first and fourth brake module BM1, BM4 and the second emergency energy supply unit NVE2 is connected to the second and third control device SG2, SG3 and to the second and third brake actuator unit BAE2, BAE3 of the second and third brake module BM2, BM3 by way of separately fed first to eighth additional energy supply lines VL11', VL12', VL21', VL22', VL31', VL32', VL41', VL42', in other words if the main energy supply unit HVE fails, an emergency supply is ensured to at least two brake modules BM1-BM4 by way of the first and/or second emergency energy supply unit NEV1, NEV2.

Advantageously two brake modules BM1-BM4 are associated respectively with each emergency energy supply unit NEV1, NEV2 thereby allowing the cabling outlay and complexity to be significantly reduced and meaning that it is not necessary to connect every brake module BM1-BM4 to the first and second emergency energy supply units NEV1, NEV 2 as a result.

The described switching structure predetermines for example a diagonal brake circuit design, in other words the first and fourth brake modules BM1, BM4, which are arranged diagonally opposite one another in the vehicle F, are connected to the first emergency energy supply unit NVE1 and the second and third brake modules BM2, BM3, which are likewise arranged diagonally opposite one another in the vehicle F, are connected to the second emergency energy supply unit NVE2. The described switching structure is selected by way of example. It is clear that numerous other brake circuit allocations are possible, for example allocation by side, by axle or by wheel.

The energy supply unit HVE, NVE1, NVE2 provided to supply energy to the first to fourth brake modules BM1-BM4 is selected by way of switching means SM11-SM42, SM11'-SM42', which can be activated at least partially separately from one another by way of the central control system ECU. In the exemplary embodiment according to FIG. 2 for example 8 of the total of 16 switching means SM11-SM42, SM11'-SM42' are activated by way of one of the two voter units IC1, IC2. Increasing the number of voter units according to FIGS. 3 and 4 increases the independence of the switching paths available for energy supply purposes.

The energy supply lines VL11-VL42, VL11'-VL42' (switching or supply paths) shown in the figures can also be formed by lines of a bus system and/or further control devices provided in the vehicle F (not shown in the figures).

With the switching structure shown in FIG. 2 the switching means SM11-SM42, SM11'-SM42' are activated or switched by way of the at least two voter units IC1, IC2, thus controlling the distribution of the electrical energy supplied by the above-mentioned energy supply units HEV, NEV1, NEV2. In this process the two energy supply lines VL11-VL42, VL11'-VL42' connecting a brake actuator unit BAE1-BAE4 or a control device SG1-SG4 to the respective energy supply unit HVE, NVE1, NVE2 and the switching means SM11-SM42, SM11'-SM42' provided to switch these through are respectively controlled separately from one another by one of the two voter units IC1, IC2, so that even if one of the voter units IC1, IC2 fails, at least one operational supply path is available for each brake actuator unit BAE1-BAE4 or for each control unit SG1-SG4 and can be opened or closed by actuating the associated switching means SM11-SM42, SM11'-SM42' by way of the remaining voter units IC1, IC2.

In one preferred embodiment in the state without current or voltage the switching means SM11'-SM42' associated with the additional energy supply lines VL11'-VL42' have a predetermined switching state, i.e. are configured as either open or closed. The predetermined switching state is selected variously here as a function of the respectively present switching structure, in particular the number of voter units IC1-IC4 provided in the central control system ECU. If for example a first and second voter unit IC1, IC2 are provided, in the state without current or voltage the switching means SM11'-SM42' are closed as standard while in the case of an implementation having a first to third voter unit IC1-IC3, they are opened as standard.

Therefore a total of 16 switchable supply paths (16 energy supply lines VL11-VL42, VL11'-VL42' and 16 switching means SM11-SM42, SM11'-SM42') are available to supply the electrical energy to the first to fourth brake module BM1-BM4. Specifically for example according to FIG. 2 the first brake actuator unit BAE1 is connected by way of first switching means SM11 and the first energy supply line VL11 to the main energy supply unit HVE and by way of additional first switching means SM11' and the first additional energy supply line VL11' to the first emergency energy supply unit NEV1. The first switching means SM11 are controlled by means of the second voter unit IC2 and the additional first switching means SM11' are controlled by means of the first voter unit IC1.

The first control device SG1 is connected by way of second switching means SM12 and the second energy supply line VL12 to the main energy supply unit HVE and by way of additional second switching means SM12' and the second additional energy supply line VL12' to the first emergency energy supply unit NEV1, with the second switching means SM12 being activated by means of the first voter unit IC1 and the additional second switching means SM12' by means of the second voter unit IC2.

Third switching means SM21 and a third energy supply line VL21 are provided to connect the second brake actuator unit BAE2 to the main energy supply unit HVE and additional third switching means SM21' and an additional third energy supply line VL21' are provided for connection to the second emergency energy supply unit NEV2, it being possible for the third switching means SM21 to be switched by means of the second voter unit IC2 and the additional third switching means SM21' to be switched by means of the first voter unit IC1.

The second control device SG2 is also connected by way of fourth switching means SM22 and the fourth energy supply line VL22 to the main energy supply unit HVE and by way of additional fourth switching means SM22' and a fourth additional energy supply line VL22' to the second emergency energy supply unit NEV2, with the fourth switching means SM22 being activated by means of the first voter unit IC1 and the additional fourth switching means SM22' by means of the second voter unit IC2.

The third brake actuator unit BAE3 is connected by way of fifth switching means SM31 and the fifth energy supply line VL31 to the main energy supply unit HVE and by way of additional fifth switching means SM31' and a fifth additional energy supply line VL31' to the second emergency energy supply unit NEV2. The fifth switching means SM31 are controlled here by way of the second voter unit IC2 and the additional fifth switching means SM31' by way of the first voter unit IC1.

The third control device SG3 is connected by way of sixth switching means SM32 and the sixth energy supply line VL32 to the main energy supply unit HVE and by way of additional sixth switching means SM32' and an additional sixth energy supply line VL32' to the second emergency energy supply unit NEV2, with the sixth switching means SM32 being activated by the first voter unit IC1 and the additional sixth switching means SM32' by the second voter unit IC2.

Finally the fourth brake actuator unit BAE4 is connected by way of seventh switching means SM41 and the seventh energy supply line VL41 to the main energy supply unit HVE and by way of additional seventh switching means SM41' and an additional seventh energy supply line VL41' to the first emergency energy supply unit NEV1. The seventh switching means SM41 are controlled here by way of the second voter unit IC2 and the additional seventh switching means SM41' by way of the first voter unit IC1.

The fourth control device SG4 is also connected by way of eighth switching means SM42 and the eighth energy supply line VL42 to the main energy supply unit HVE and by way of additional eighth switching means SM42' and an additional eighth energy supply line VL42' to the second emergency energy supply unit NEV2. The eighth switching means SM42 are activated by way of the first voter unit IC1 and the additional eighth switching means SM42' by way of the second voter unit IC2.

In the exemplary embodiment shown in FIG. 2 with a first and second voter unit IC1, IC2 the additional switching means SM11'-SM42' are designed so that they are closed, if the first or second voter unit IC1, IC2 fails, i.e. is in the state without current. Also the switching means SM11, SM11', SM21, SM21', SM31, SM31', SM41, SM41' provided to supply electrical energy to the brake actuator units BAE1-BAE4 are formed respectively by two switching elements connected in series, while the switching means SM12, SM12', SM22, SM22', SM32, SM32', SM42, SM42' provided to supply electrical energy to the control devices SG1-SG4 respectively have a switching element and diode element likewise connected in series for example.

Normally, i.e. when there is no fault, the brake modules BM1-BM4 are supplied with electrical energy by way of the main energy supply unit HVE, i.e. the first to eighth switching means SM11-SM42 are closed for the transmission of electrical energy by way of the first to eighth energy supply line VL11-VL42 and the additional first to eighth switching means SM11'-SM42' are open for switching through the additional first to eighth energy supply lines VL11'-VL42'.

Figure 5:
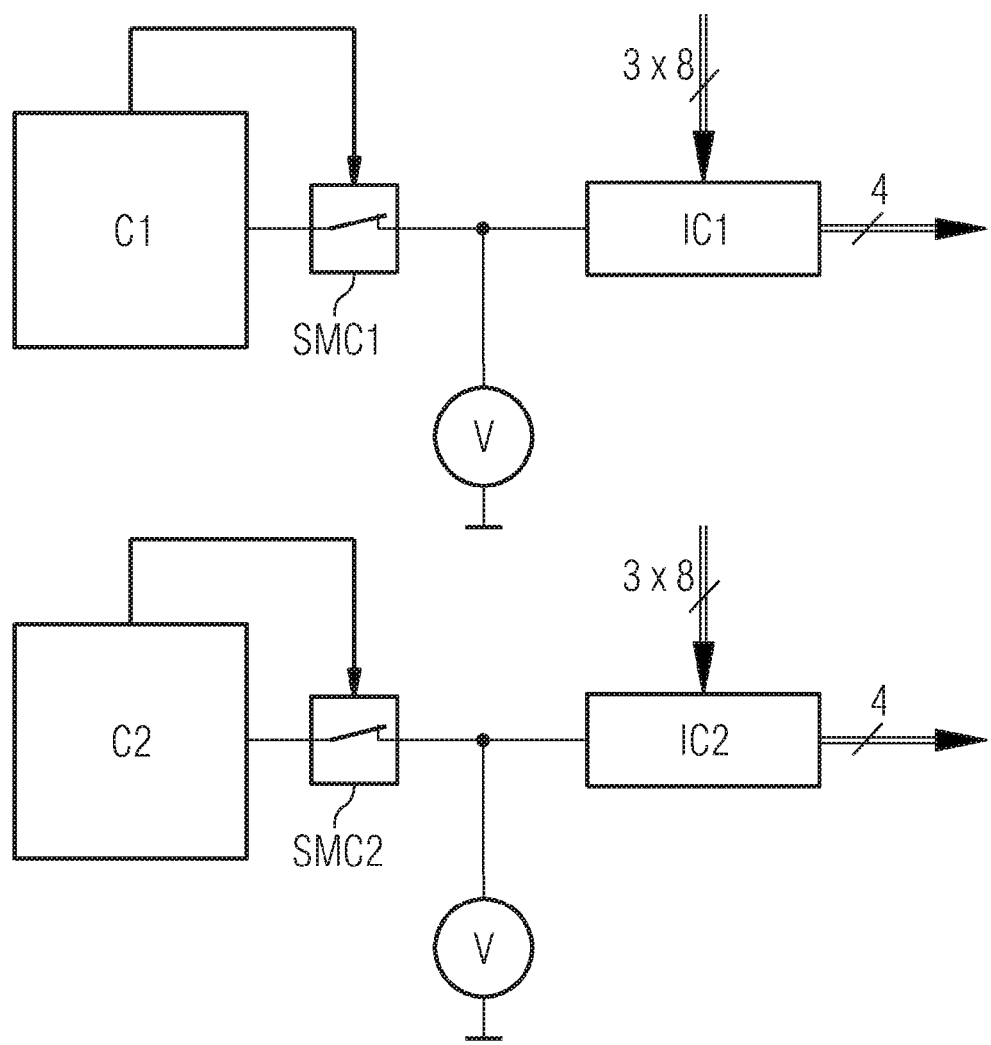
FIG. 5 shows an example of a segment of the switching structure not shown in FIGS. 2 and 3 for detecting the voltage and/or currents present at the brake modules.

In order in the event of a fault to be able to switch the switching means SM11-SM42, SM11'-SM42' controlled by the first and/or second voter unit IC1, IC2 to be without current, hereby bringing about the opening or closing of the affected switching means SM11-SM42, SM11'-SM42' as a function of the predetermined switching state of the switching means SM11-SM42, SM11'-SM42', the energy supply to the first or second voter unit IC1, IC2 can be disconnected by way of further switching means SMC1, SMC2, being for example controlled by way of at least one of the control units C1, C2, C3. FIG. 5 shows a schematic block circuit diagram of an example of a corresponding segment of the circuit structure.

The control units C1 and C2, which are preferably configured as microcontrollers, generally have voltage regulator units, which can be used to evaluate the voltages and/or currents present at the brake actuator units BAE1-BAE4. The first control unit C1 is connected by way of a first further switching means SMC1 and the second control unit C2 by way of a second further switching means SMC2 to the first or second voter unit IC1, IC2. If a malfunction of one of the brake actuator units BAE1-BAE4 is detected for example by at least one of the control units C1, C2, the affected voter unit IC1, IC2 can be switched to be without current by opening the switching means SMC1, SMC2 associated with the voter unit IC1, IC2 to be disconnected, thereby switching the switching means SM11-SM42, SM11'-SM42' associated with the disconnected voter unit IC1, IC2 to the respectively predetermined switching state, for example closing it according to FIG. 2. This produces at least two further switching paths for disconnecting a defective brake module BM1-BM4.

Figure 3:
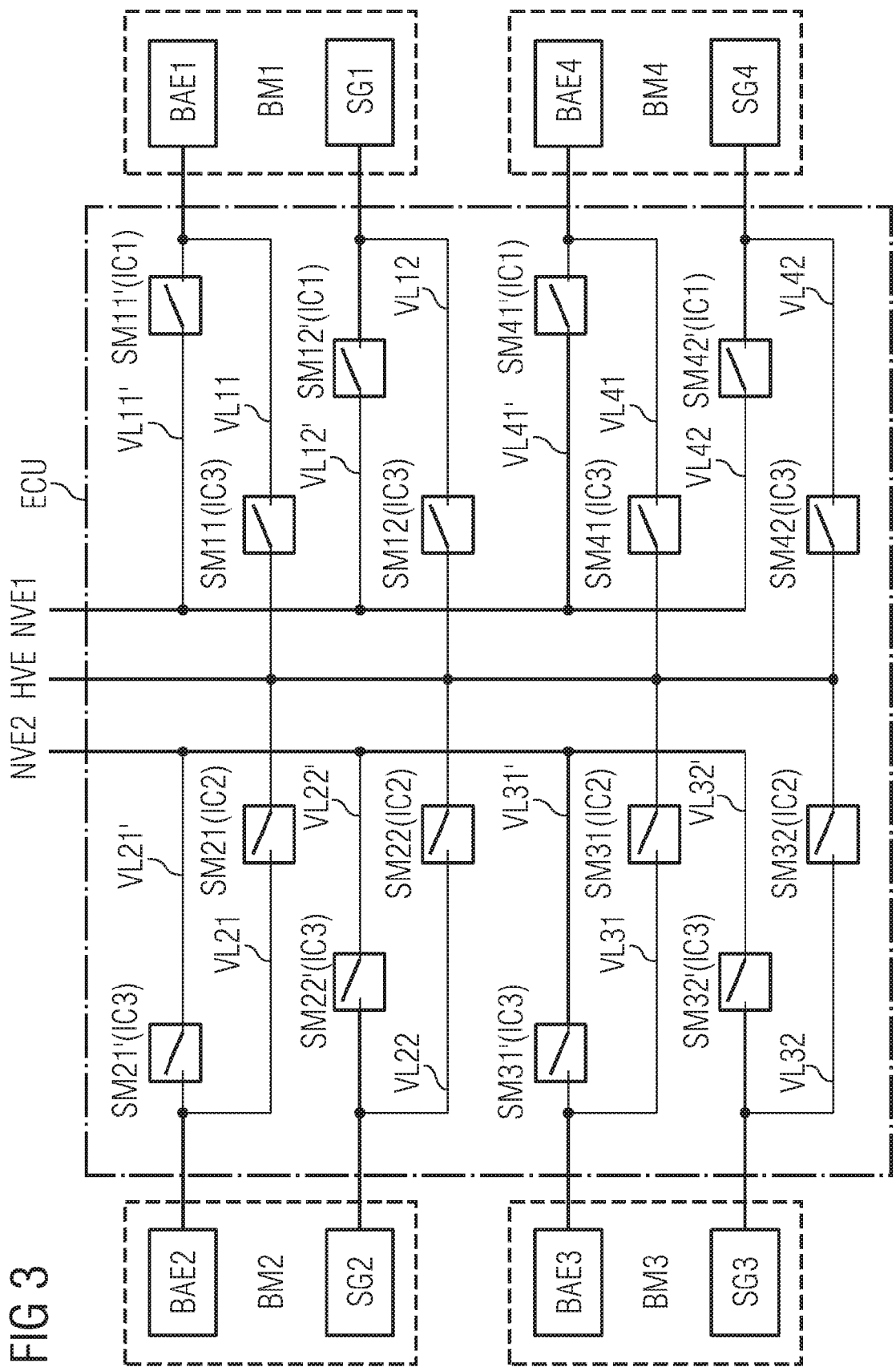
FIG. 3 shows an example of a circuit structure with three voter units provided to supply energy to the electromechanical brake system.

In contrast to the circuit arrangement shown in FIG. 2, in FIG. 3 at least one first to third voter unit IC1, IC2, IC3 (3 voter design) is provided to control the switching means SM11-SM42, SM11'-SM42'. Three voter units IC1, IC2, IC3 are now available to control the energy supply by way of the 16 energy supply lines VL11-VL42, VL11'-VL42', i.e. 4 of the 16 switching means SM11-SM42, SM11'-SM42' are activated respectively by the first and second voter unit IC1, IC2 and 8 of the 16 switching means SM11-SM42, SM11'-SM42' are activated by the third voter unit IC3. In order to be able to prevent undesirable braking of the electromechanical brake system reliably even after the occurrence of a second fault in the energy distribution, provision is made for the circuit principle shown in FIG. 5, with the result that additional switching paths are provided. If under the control of one or more control units C1-C3 one of the voter units IC1-IC3 is isolated from the energy supply by means of the further switching means SMC1, SMC2, the associated switching means SM11-SM42, SM11'-SM42' are open as standard, which in turn results in the disconnection of the energy supply to individual brake modules BM1-BM4 and the resulting triggering of the respective brake actuator unit BME1-BME4.

Figure 4:
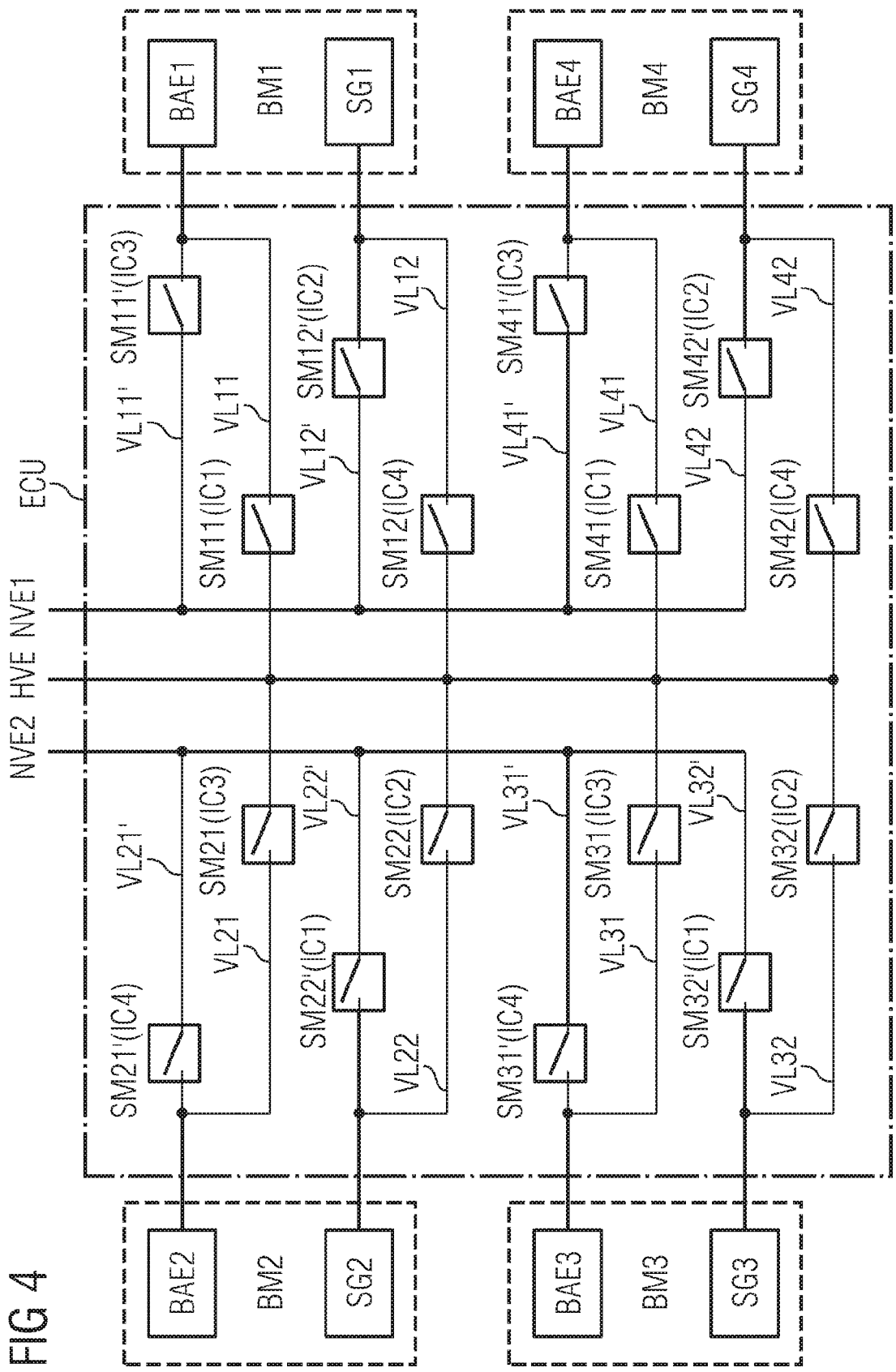
FIG. 4 shows an example of a circuit structure with four voter units provided to supply energy to the electromechanical brake system.

In a further particularly advantageous variant according to FIG. 4 a first to fourth voter unit IC1, IC2, IC3, IC4 (4 voter design) is provided to control the switching means SM11-SM42, SM11'-SM42'. Here a voter unit IC1, IC2, IC3, IC4 is associated respectively with one of the four energy supply lines VL11-VL42, VL11'-VL42' or switching means SM11-SM42, SM11'-SM42' provided to supply energy to a brake module BM1-BM4, in other words these can be switched independently of one another. To prevent undesirable braking of a brake module BM1-BM4, the energy supply at least to one brake actuator unit BAE1-BAE4 and/or one control unit SG1-SG4 of the corresponding brake module BM1-BM4 should be interrupted. The illustrated allocation of the switching means SM11-SM42, SM11'-SM42' ensures a 2 fault tolerance, i.e. even if two of the four voter units IC1-IC4 fail, secondary braking by way of the remaining functioning brake modules BM1-BM4 is still possible.

If the third and fourth voter unit IC3, IC4 fails for example during a braking operation, all the brake modules BM1-BM4, the energy supply to which is controlled by means of the third and fourth voter unit IC3, IC4, are switched to be without current or voltage. In the present exemplary embodiment the energy supply to the second brake actuator unit BAE2 (left front wheel WFL) and the third brake actuator unit BAE3 (right rear wheel WFL) is interrupted, i.e. the associated brakes open without current and cannot cause undesirable braking. To achieve secondary braking, the remaining functioning first and fourth brake module BM1, BM4 can be actuated in stages for example. The first brake actuator unit BAE1 of the first brake module BM1 is supplied here with electrical energy by way of the first energy supply line VL11 from the main energy supply unit HVE and the first control unit SG1 is supplied with electrical energy by way of the additional second energy supply line VL21' from the first emergency energy supply unit NVE1. Similarly the fourth brake actuator unit BAE4 of the fourth brake module BM4 is supplied with electrical energy by way of the seventh energy supply line VL41 from the main energy supply unit HVE and the fourth control device SG4 is supplied with electrical energy by way of the additional eighth energy supply line VL42' from the first emergency energy supply unit NVE1.

The 2 fault tolerance of the described electromechanical brake system is configured with absolute integration, in other words if for example the main energy supply unit HVE and one of the emergency energy supply units NVE1, NVE2 fail, secondary braking can still be achieved by way of the remaining functioning emergency energy supply NVE1, NVE2.

Secondary braking is also ensured if just one fault occurs at any time. Also adjusted braking force distribution can also be provided for example under the control of the central control system ECU for the still functioning brake modules BM1-BM4, thereby ensuring safe drive stability.

The invention was described above using an exemplary embodiment. It is evident that numerous changes and modifications are possible without as a result departing from the inventive concept underlying the invention.

What is claimed is:

1. An electromechanical brake system for vehicles with a failsafe energy distribution, the system comprising:
   a first to fourth brake module associated respectively with a wheel of the vehicle;
   each brake module comprising at least one control device and a brake actuator unit;
   a main energy supply unit supplying electrical energy to the brake modules;
   the control device and the brake actuator unit of a brake module being connected respectively by way of separately fed energy supply lines to the main energy supply unit;
   a first voter unit and a second voter unit controlling the distribution of electrical energy to the respective control devices and the respective brake actuator units;
   a first emergency energy supply unit separate from the main energy supply unit connected to the control device and to the brake actuator unit of the first and fourth brake module;
   a second emergency energy supply separate from the main energy supply unit and the first emergency energy supply unit connected to the control device and to the brake actuator unit of the second and third brake module by way of respectively additional separately fed energy supply lines; and
   first to eighth switching means switching through the energy supply lines and additional first to eighth switching means switching through the additional energy supply lines, it being possible to switch these separately from one another;
   wherein the first voter unit controls the first to eighth switching means and the second voter unit controls the additional first to eighth switching means.

2. The electromechanical brake system according to claim 1, wherein to control the distribution of the electrical energy to the respective control device and the respective brake actuator unit, at least a first and second voter unit are provided.

3. The electromechanical brake system according to claim 1, wherein first to eighth switching means are provided to switch through the energy supply lines and additional first to eighth switching means are provided to switch through the additional energy supply lines, it being possible to switch these separately from one another.

4. The electromechanical brake system according to claim 1, wherein a switching means includes a controllable switching element or a series circuit of two controllable switching elements or a series circuit of one controllable switching element and a diode element.

5. The electromechanical brake system according to claim 1, wherein in the state without current or voltage the switching means have a predetermined switching state, which is selected variously as a function of the respectively present switching structure.

6. The electromechanical brake system according to claim 1, wherein the first brake module is associated with the right front wheel, the second brake module with the left front wheel, the third brake module with the right rear wheel and the fourth brake module with the left rear wheel.

7. The electromechanical brake system according to claim 1, wherein the association of the energy supply units with the brake modules is selected such that the brake circuits are allocated diagonally, by side, by axis or by wheel.

8. The electromechanical brake system according to claim 1, wherein the energy supply to the first or second voter unit can be disconnected by way of further switching means, it being possible for the switching means to be controlled by way of at least one control unit provided in the central control system.

9. The electromechanical brake system according to claim 8, wherein the at least one control unit is set up to evaluate the voltages or currents present at the brake actuator units, with the energy supply to the first or second voter unit being disconnected by way of the further switching means as a function of the result of the evaluation.

10. The electromechanical brake system according to claim 1, wherein in the state without current or voltage the switching means have a predetermined switching state, which is selected variously as a function of the number of voter units provided.

11. A method for failsafe energy distribution in an electromechanical brake system for vehicles comprising a first to fourth brake module associated respectively with a wheel of the vehicle, each brake module comprising at least one control device and a brake actuator unit, wherein the control device and the brake actuator unit of a brake module are supplied with electrical energy separately from one another under the control of at least one central control system, the method comprising the steps of:
supplying energy to the first through fourth brake module from a main energy supply unit;
detecting the occurrence of a first and second system fault by way of the at least one central control system; and
controlling the energy distribution in the electromechanical brake system by way of a first voter unit and a second voter unit operating first to eighth switching means switching through the energy supply lines and the additional energy supply lines such that after the occurrence of a first and second system fault at least two brake modules are still available to brake the vehicle and at least one of the remaining brake modules affected by the first or second system fault is disconnected;
wherein energy distributed to the first and fourth brake module after the occurrence of a fault is supplied from a first emergency energy supply unit; and
energy distributed to the second and third brake module after the occurrence of a fault is supplied from a second emergency energy supply unit.

12. The method according to claim 11, wherein the electrical energy is distributed to the brake modules of the vehicle by side, by axle or by wheel.

13. The method according to claim 11, wherein in the state without current or voltage the switching means are controlled to a predetermined switching state, which is selected variously as a function of the respectively present switching structure.

* * * * *